Figure 1:
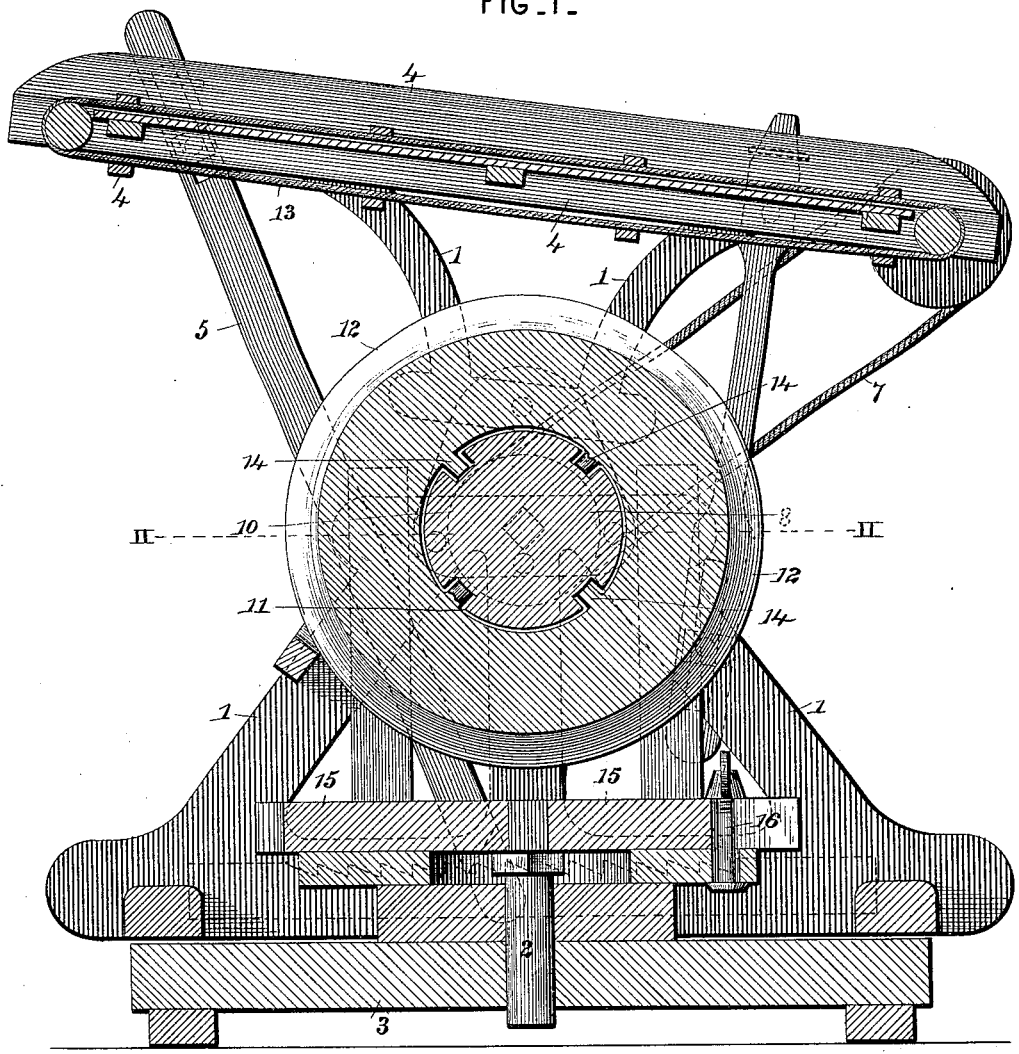

(No Model.) 2 Sheets—Sheet 1.

G. R. MITCHELL.
DEVICE FOR TRANSMITTING POWER.

No. 326,914. Patented Sept. 22, 1885.

Attest:
Geo. T. Smallwood.
Jas. K. McCathran.

Inventor:
George R. Mitchell.
By Knight Bros. attys.

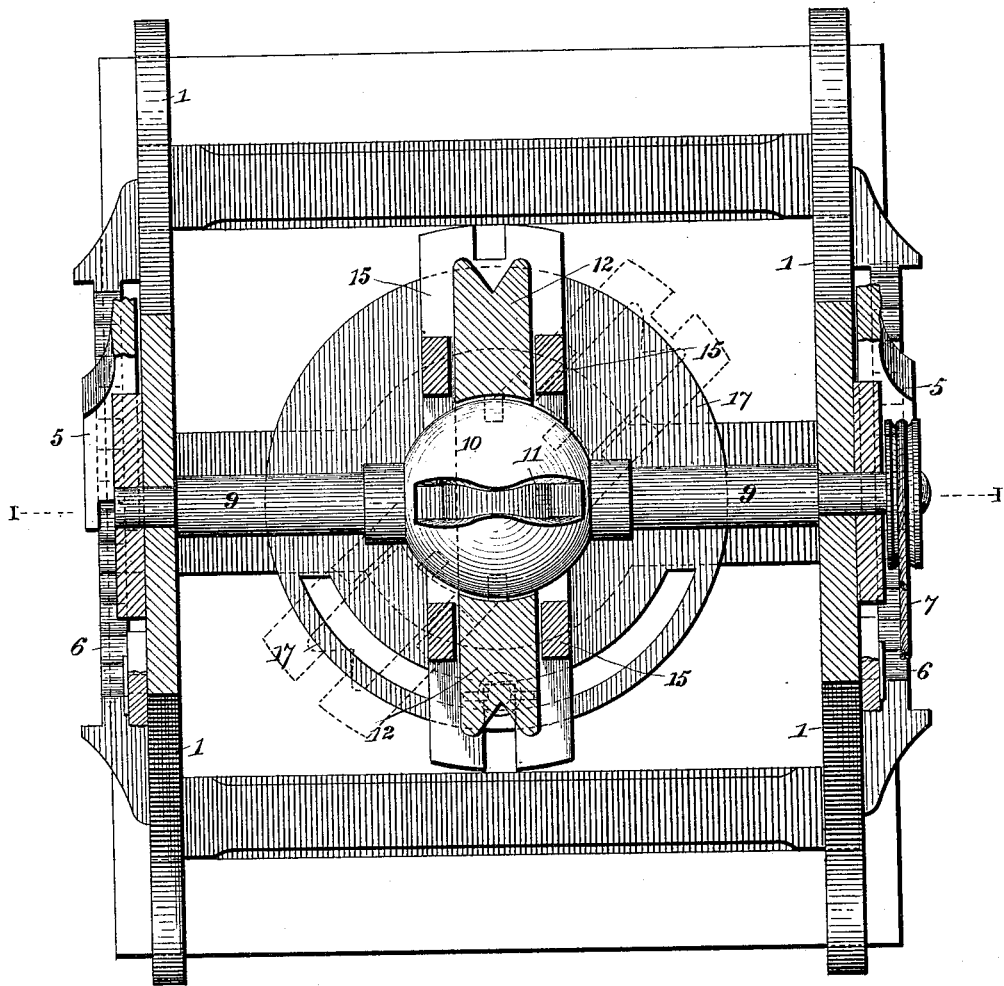

UNITED STATES PATENT OFFICE.

GEORGE R. MITCHELL, OF CHILLICOTHE, OHIO, ASSIGNOR OF ONE-THIRD TO WILLIAM L. MILLER, OF SAME PLACE.

DEVICE FOR TRANSMITTING POWER.

SPECIFICATION forming part of Letters Patent No. 326,914, dated September 22, 1885.

Application filed March 18, 1885. (No model.)

*To all whom it may concern:*

Be it known that I, GEORGE R. MITCHELL, a citizen of the United States, residing at Chillicothe, in the county of Ross and State of Ohio, have invented a new and useful Improvement in Devices for Transmitting Power, of which the following is a specification.

The object of the invention is to provide such a connection between a pulley and the shaft which it is to rotate, or vice versa, that the belt may pass the pulley in a direction and said pulley occupy a position not necessarily at right angles to the axis of the driving-shaft. To this end the driving-shaft is provided with a spheroidal cam or driving-boss formed with equidistant grooves in planes parallel with the axis of the shaft and enlarged toward their ends, the said grooves receiving inwardly-projecting pins on a driving-pulley mounted in a guiding-frame, which may be turned in any direction to suit the line of the driving-belt.

The accompanying drawings illustrate the application of the invention to a straw-stacker for thrashing-machines.

Figure I is a vertical section of the straw-stacker on the line I I, Fig. II. Fig. II is a horizontal section on the line II II, Fig. I.

The stacker-frame 1 is mounted by a central pivot, 2, on a bed, 3, so as to be turned in any direction required to suit the thrashing-machine and the desired location of the stack. The straw-carrier 4 is mounted in customary manner on a horizontal axis, so that it may be elevated as required, and is supported at the desired angle by adjustable standards 5 and racks 6. The endless apron 13 of the carrier is driven by a belt, 7, from a pulley, 8, on the shaft 9, on the center of which shaft is keyed a spheroidal boss or cam, 10, having a number of longitudinal grooves, 11, contracted in their central parts on the equatorial line of the cam and widened toward their ends. This cam is surrounded by an annular pulley, 12, driven by a belt from the thrashing-machine or other motor, and provided with inwardly-projecting radial pins 14, engaging in the grooves 11. The annular pulley 12 is adjusted and held in any desired vertical plane, as illustrated in dotted lines in Fig. II, by a guiding-frame, 15, which may be turned on a pivot directly beneath the center of the spheroidal cam 10, and concentric with the vertical pivot of the main frame 1. Clamp-bolts 16, engaging with the base of the adjustable guide-frame 15, and with a slotted plate, 17, on which the said guide-frame rests, secure the latter in any position in which it may be set.

It will now be apparent that the driving-pulley 12 will communicate an effective and constant rotary movement to the shaft 9, whatever may be their relative angle, the motion being communicated from the annular pulley 12 by such of the radial pins 14 as are for the time being at the mid-length of the grooves 11, or on or near the equatorial line of the spheroidal cam, while the enlargement of the grooves toward their extremities permits the driving-pins in their constant and uniform movement to follow and accommodate themselves to the alternately lessening and increasing movement of the parts of the grooves which they occupy, due to the different radial distances thereof from the axis of the shaft.

I have illustrated the applicability of my invention to the driving of a straw-stacker for thrashing-machines, for which purpose it is well adapted; but I do not desire to be understood as limiting myself to this particular use or application, as it is useful in transmitting power for many and various purposes in which a driving-belt is required to take a plane variable with reference to the shaft or at an oblique angle thereto. It will also be apparent that the invention is as well applicable to communicating motion from a driving-shaft to a belt through which power is to be transmitted as from a driving-belt, 13, to a shaft, 9, driven thereby, as in the present illustration.

Having thus described my invention, the following is what I claim as new therein and desire to secure by Letters Patent:

1. The combination of the annular pulley 12 and the spheroidal cam 10 on the shaft 9, said pulley being provided with inwardly-projecting pins 14 and the cam 10, with longitudinal grooves 11, enlarged at their ends, as and for the purposes shown and described.

2. The combination of the shaft 9, spheroidal cam 2, grooves 11, annular pulley 12, driving-pins 14, guiding-frame 15, and the slotted plate 17, by which said guiding-frame is held in any required position to determine the plane of rotation of the driving-pulley 12.

GEORGE R. MITCHELL.

Witnesses:
HILEN K. GALBRAITH,
ROBERT D. McDOUGAL.